United States Patent

Hoshi et al.

[11] Patent Number: 5,539,718
[45] Date of Patent: Jul. 23, 1996

[54] OPTICAL HEAD FOR CONTROLLING LIGHT IRRADIATION IN A MAGNETO-OPTICAL RECORDING AND/OR REPRODUCING APPARATUS

[75] Inventors: Hiroaki Hoshi, Yokohama; Susumu Matsumura, Kawaguchi; Masakuni Yamamoto, Yamato; Eiji Yamaguchi, Zama, all of Japan

[73] Assignee: Canon Kabushiki Kaisha, Tokyo, Japan

[21] Appl. No.: 115,656

[22] Filed: Sep. 3, 1993

[30] Foreign Application Priority Data

Sep. 10, 1992 [JP] Japan ................................ 4-266896

[51] Int. Cl.$^6$ ...................................... G11B 7/00
[52] U.S. Cl. .................. 369/100; 369/116; 369/107; 369/13; 369/120
[58] Field of Search ................................... 369/100, 124, 369/116, 13, 107, 120

[56] References Cited

U.S. PATENT DOCUMENTS

| | | | |
|---|---|---|---|
| 4,982,393 | 1/1991 | Matsushita et al. | 369/44.32 |
| 5,067,117 | 11/1991 | Shimizu et al. | 369/116 |
| 5,073,888 | 12/1991 | Takahashi et al. | 369/116 |
| 5,136,573 | 8/1992 | Kobayashi | 369/116 |
| 5,233,596 | 8/1993 | Tani | 369/116 |
| 5,235,587 | 8/1993 | Bearden et al. | 369/116 |
| 5,283,775 | 2/1994 | Finkelstein et al. | 369/116 |
| 5,297,128 | 3/1994 | Yamaguchi et al. | 369/116 |

FOREIGN PATENT DOCUMENTS

| | | |
|---|---|---|
| 3-268252 | 11/1991 | Japan . |
| 4-155640 | 5/1992 | Japan . |
| 4-178941 | 6/1992 | Japan . |

*Primary Examiner*—Georgia Y. Epps
*Assistant Examiner*—Kim-Kwok Chu
*Attorney, Agent, or Firm*—Fitzpatrick, Cella, Harper & Scinto

[57] ABSTRACT

An optical head includes an irradiating device for irradiating a recording medium with a light beam, a separating device disposed in an optical path between the recording medium and the irradiating device, which is provided for separating a portion of the light beam traveling from the irradiating device to the recording medium, and a detecting device for detecting the portion of the beam separated by the separating device, which has a plurality of sensor portions.

11 Claims, 11 Drawing Sheets

OPTICAL HEAD FOR CONTROLLING LIGHT IRRADIATION IN A MAGNETO-OPTICAL RECORDING AND/OR REPRODUCING APPARATUS

BACKGROUND OF THE INVENTION

1. Field of the Invention

The present invention relates to an optical head used in an optical information recording/reproducing apparatus which optically records and/or reproduces information with an information recording medium such as a magneto-optical disk. More particularly, the invention relates to an optical information recording/reproducing apparatus improved in its optical head portion effecting for recording and/or reproduction.

2. Related Background Art

Information record media employed in optical information recording/reproducing methods are used as external storage means for computers, because they have a large data record capacity in spite of their compactness. Among such media, magneto-optical information record media are more effective with respect of data rewritable properties. The mark position record method and the mark length record method (edge record method) are conventionally known as the method for information recording and/or reproduction with such storage means. It is understood that the latter is more advantageous than the former in that the data capacity is greater. In order to accurately reproduce information from a record medium recorded by the latter method, an edge position of an information bit must be accurately read by the optical head portion.

Normally, an optical information recording/reproducing apparatus used with a magneto-optical recording medium is operated such that an objective lens in an optical head focuses a beam from a semiconductor laser as a light source into a micro spot, data recording is carried out with this optical spot by the mark position record method, and such that information reproduction is performed by differential detection of a change in quantity of reflected light of the micro spot from the information bit. In such a conventional differential detection method, the reflected light is decomposed into two signal beams having different polarization components by a polarizing beam splitter having a polarization axis inclined at 45 degrees to the polarization direction of the incident linearly-polarized light. Two signals are detected from the two beams and processed to obtain a differential signal therebetween.

On the other hand, a problem will arise if a single micro spot having a light quantity distribution of conventionally known Gaussian distribution type is used in the mark length record method and if the differential detection is carried out with a light quantity change of reflected light thereof from an information bit. That is, the edge detectivity is low occur in detection of light quantity change for all reflected light beams, because the light quantity distribution of a light spot is of the Gaussian distribution having a certain spread. Means for solving the problem is already proposed as described for example in Japanese Laid-open Patent Application No. 3-268252, Japanese Laid-Open Patent Application No. 4-155640 or Japanese Laid-Open Patent Application No. 4-178941. In detail, the apparatus is so arranged such that a sectioned sensor detects a light quantity distribution in a far field or on a re-imaging plane thereby to obtain for example a spatial difference signal and then to obtain an edge detection signal with less jitters. On the other hand, there are various record methods, e.g., the magnetic field modulation and the optical modulation, proposed for magneto-optical recording of information.

The conventional examples as described above, however, still include the following unsolved problems. No consideration was made about an emission distribution of a light source in the above conventional examples. Then, the emission distribution and the oscillation mode are different between two excitation levels of a semiconductor laser corresponding to "0" and "1" in recording. Such differences will cause a change in light quantity distribution of a light spot on such a record medium as well as jitters being caused on a record edge due to the transient response during modulation. Also, jitters are seen in reproduction, which are specific to the edge detection and which are caused for example by a dispersion between laser elements, a change with time, unstable laser oscillation due to return light, and spatial unevenness which is a fluctuation of a diffraction pattern at respective apertures in a transmission optical system with wavelength change because of high-frequency superposition.

SUMMARY OF THE INVENTION

The present invention has been accomplished taking the above circumstances into account and paying attention to a light quantity distribution of a light spot. It is an object of the present invention to provide an optical information recording/reproducing apparatus provided with means for detecting the light quantity distribution, in which an error signal is obtained from the thus detected signal and a signal in a desired light quantity distribution and in which high-density recording and/or reproduction with less jitters can be achieved by minimizing the error by light quantity distribution control means or by correcting a reproduction signal with the error signal.

The above object can be achieved in the present invention by an optical information recording/reproducing apparatus in which a beam from a laser is guided to pass through a projection optical system to form a micro light spot on an information track on an information record surface and in which reflected light from the information record surface or transmitted light therethrough is guided through a reception optical system to a first photodetector to record information on said information record surface and/or to reproduce information therefrom, wherein provided in an optical path of the projection optical system or in an optical path of the reception optical system are a beam splitter for extracting a part of the beam and a second photodetector which is divided at least by a dividing line extending in a direction perpendicular to the information track in order to detect the extracted beam.

The object also can be achieved in the present invention by an optical information recording/reproducing apparatus in which a beam from a laser is guided to pass through a projection optical system to form a micro light spot on an information track on an information record surface and in which reflected light from the information record surface or transmitted light therethrough is guided through a reception optical system to a photodetector to record information on said information record surface and/or to reproduce information therefrom, wherein laser beam distribution control means is provided in an optical path of the laser or the projection optical system, wherein the photodetector comprises a sectioned photodetector which is divided at least by a dividing line extending in a direction perpendicular to the information track, and wherein the laser beam distribution control is carried out using an output obtained by electrically processing outputs from the sectioned photodetector.

Many other features of the present invention will be clarified in the embodiments thereof as will be described below.

BRIEF DESCRIPTION OF THE DRAWINGS

FIG. 13A to FIG. 13J are schematic drawings of waveforms; and

DETAILED DESCRIPTION OF THE PREFERRED EMBODIMENTS

Figure 1:
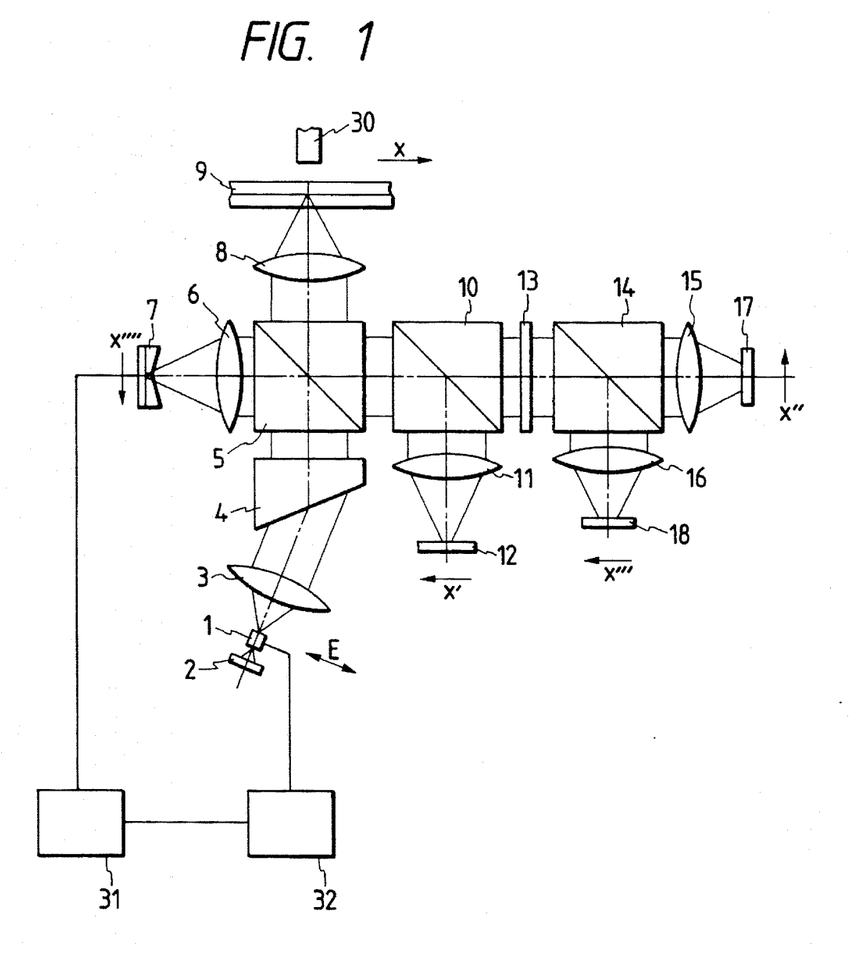
FIG. 1 is a constitutional drawing of an optical system in an optical head to show the first embodiment of the present invention.

The embodiments of the present invention will be described in detail with reference to the accompanying drawings. FIG. 1 shows an optical head in an optical information recording/reproducing apparatus of the first embodiment according to the present invention. In FIG. 1, reference numeral 1 designates a semiconductor laser having an emission pattern control function, 2 an optical sensor for monitoring the rear output from the semiconductor laser 1, 3 a collimator lens, 4 a beam shaping prism, 5 a polarizing beam splitter (for example, p-polarized light transmittance: about 70%; p-polarized light reflectivity: about 30%; s-polarized light reflectivity: about 100%), 6 a front monitor imaging lens, 7 a half-sectioned sensor with an amplitude separation prism function, 8 a pickup lens, 9 a magneto-optical disk, 10 a beam splitter, 11 a servo sensor lens (having a cylindrical surface), 12 a quarter-sectioned servo sensor, 13 a half-wave plate, 14 a perfect polarizing beam splitter (p-polarized light transmittance: 100%; s-polarized light reflectivity: 100%), 15 and 16 re-imaging lenses, and 17, 18 half-sectioned RF sensors for detecting a magneto-optical signal, each of which is disposed at a defocused position. Also, E represents a direction of polarization of the semiconductor laser 1, x a direction parallel to an information track along which a light spot scans on the optical disk 9, x' a direction parallel to the information track on the servo sensor 12, x", x''' a direction parallel to the information track on RF sensor 17 or 18, and x'''' a direction corresponding to the direction x''' parallel to the information track on the front monitor sensor. The sectioned sensor 7 detects asymmetry of space distribution of a laser beam with respect to a predetermined axis.

The semiconductor laser 1 layered in the direction perpendicular to the plane of the drawing emits light which is substantially linearly polarized in the direction E. The emitted light is collimated by the collimator lens 3, and an elliptic light quantity distribution of the collimated beam is then shaped by the shaping prism 4 to have a corrected light quantity distribution of a substantial circle. The polarizing beam splitter 5 transmits about 70% of the beam and the transmitted light is guided by the pickup lens 8 to impinge on the surface of a record medium on the magneto-optical disk 9 while forming an image of a light spot at a diffraction limit. An external magnetic field is applied as an auxiliary magnetic field by a permanent magnet 30 to a micro region of the light spot. A current modulated according to binary information to be recorded is injected into the semiconductor laser 1 to modulate a light quantity of a light spot. By this, a magneto-optical domain is formed so that information may be recorded in the record medium surface on the magneto-optical disk 9. On this occasion, edge recording is effected corresponding to information at the position of a magnetic domain wall on the border between an upward domain and a downward domain.

A part of reflected light from the magneto-optical disk 9 is guided again through the pickup lens 8 to the polarizing beam splitter 5. The polarizing beam splitter 5 reflects about 30% of a p-polarization component and about 100% of an s-polarization component in the reflected light toward the detection optical system. Further, the beam splitter 10 directs a part of the incoming light toward the servo lens 11 and then to the quarter-sectioned servo Sensor 12 therefrom. The servo lens 11 has a cylindrical plane, the generatrix of which is inclined at 45° in the x' direction to the optical axis within a plane parallel to the lens pupil surface. This is for decreasing the crosstalk between tracking error and focusing error. Also, the quarter-sectioned servo sensor 12 is of a shape of a quartered square and is disposed at the position of the circle of least confusion of the servo lens 11. The astigmatism method is employed herein for autofocus and the push-pull method for autotracking.

When the beam transmitted through the beam splitter 10 passes through the half-wave plate 13, the polarization direction thereof is rotated. The beam is then polarized and separated by the polarizing beam splitter 14. Each separated polarization component is guided by re-imaging lens 15, 16 to the half-sectioned sensor 17, 18 to be separately detected in each direction x" or x''' parallel to the track. Segmental outputs from each half-sectioned sensor 17, 18 are supplied to a differential amplifier, which executes the differential operation to obtain a spatial differential signal output. Further differential amplification with the two differential signal outputs provides a differential signal from which common-mode noises are removed, whereby an excellent edge detection signal can be obtained. This is the edge detection method using the Kerr effect of the magneto-optical domain and the diffraction effect of the domain edge.

In more detail, the linearly polarized light E (say, p-polarized light) entering the magneto-optical disk 9 is converted by the Kerr effect in domain into horizontally and elliptically polarized light with the major axis being rotated by $\pm\theta_k$ depending upon the vertical direction of magnetization in the domain. The newly produced Kerr component, that is, s-polarization component by upward magnetization has a phase difference of K from that by downward magnetization. In view of the s-polarization component, a recorded domain behaves as a phase grating providing a phase difference π. If a domain edge is located at the center of a Gaussian spot, that is, on the optical axis, the s component is diffracted by 0, π phase edges, so that the resulting diffraction pattern is split into two patterns with a dark line at the center on the pupil plane of the pickup lens. On the other hand, the p-polarization component which is not phase-modulated on the disk is kept still Gaussian, so that the phase distribution thereof is uniform. Considering the phase of p-polarized light as a reference, the phase of s-polarized light on the pupil plane or in far field is $\pm(\pi/2+\phi)$ in the two separate regions, respectively, when an edge is located at the center of a spot. Here, $\phi$ is the phase shift upon the elliptic change due to the Kerr effect. In other words, the phase shift of $\pm\pi/2$ is effected in far field by the diffraction effect of 0, π phase edges. The half-wave plate 13 rotates the elliptic polarization as spatially unevenly distributed in the polarization state of far field with such p-polarization and s-polarization components.

Figure 2A:
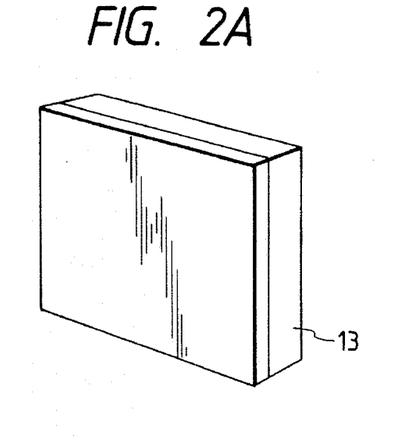
FIG. 2A and FIG. 2B are schematic drawings to show a composite phase plate.
Figure 2B:
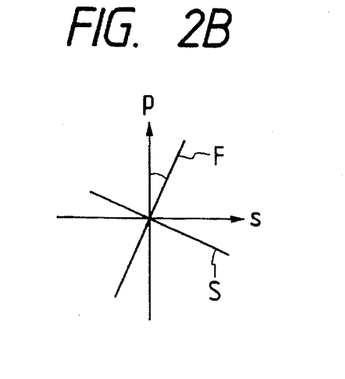

FIG. 2A is a schematic drawing to illustrate the half-wave plate 13. If the half-wave plate 13 has a fast axis (axis on which the phase relatively advances) rotated by 22.5° with respect to the p-polarization direction, as shown in FIG. 2B, the polarization will have a rotation of 45°. This enables the differential detection in which common-mode noises may be removed between the transmitted light and the reflected light of the polarizing beam splitter 14 and the signal amplitude may be doubled. When each beam is re-imaged by the re-imaging lens 17, 18, a new diffraction pattern appears on the re-imaging plane by the optical Fourier transformation. However, since the beam is focused in a fine region (approximately equal to the size obtained by multiplying the size of a light spot on a magneto-optical disk by a ratio between the focal length of a pickup lens and the focal length of a re-imaging lens), it is located within a gap between sensor segments of a sectioned sensor (which cannot be narrowed below 5–10 μm to avoid the crosstalk between sensor segments), which makes good spatial separation impossible. The problem of sensor GaP is solved herein by detecting a far field diffraction pattern having the corrected polarization distribution as described above by the half-sectioned sensor 17, 18, as shown in FIG. 1, instead of the detection on the focal plane of re-imaging lens 15, 16. Strictly speaking, the diffraction pattern at the position defocused from the focal plane of re-imaging lens 15, 16 is different from that on the pupil plane, but there appears no outstanding signal difference in the far field pattern in the detection with the domain edge on the optical axis of a light spot.

As described above, the edge may be detected by the spatial differential detection. In the detection, a change of emission pattern of semiconductor laser 1, especially, an imbalance thereof in the direction x parallel to the track, would result in generating a jitter component in edge detection signal. Also, in an case of information recording, the injection current is modulated to obtain two light output levels corresponding to the binary signals, and therefore the excitation energy is switched at high speed between two excitation levels, which readily affects the symmetry of the emission pattern. This problem is solved in the present embodiment by the arrangement as shown in FIG. 1, in which the reflected light from the polarizing beam splitter 5 on the laser 1 side is re-imaged by the front monitor imaging lens 6, the emission pattern of laser 1 is monitored by the half-sectioned sensor 7 located at the imaging position, an error to the reference value of spatial distribution of the laser beam is detected by the error detector 31, and the emission pattern of laser 1 is controlled with the error signal through the laser drive controller 32. Here, the reference value is ideally 0, but substantially an error amount of an emission pattern determined by a permissible jitter amount in edge detection. In this embodiment, the front output of laser 1 is detected in the near field range. The error detector 31 has an electric circuit, which electrically processes outputs from the sectioned sensor 7 to output an error from the reference value of spatial distribution of the laser beam.

Figure 3A:
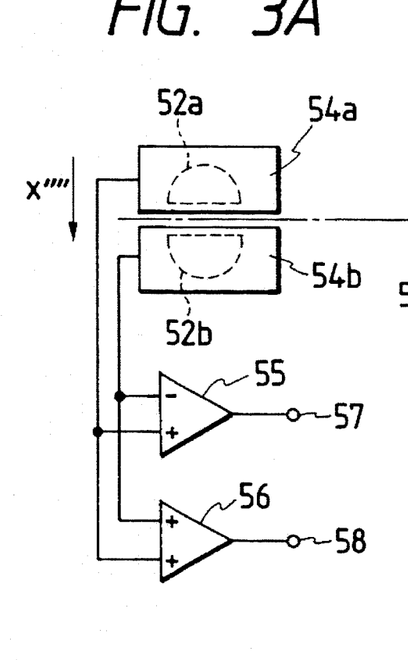
FIG. 3A and FIG. 3B are schematic drawings of an emission pattern detector.
Figure 3B:
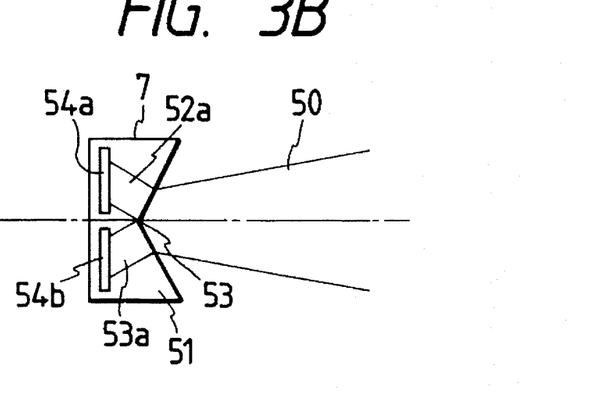

FIG. 3A and FIG. 3B are enlarged views to schematically show the front monitor sectioned sensor. As shown in FIG. 3B, a re-imaging beam 50 of emission pattern is guided to a wavefront separating prism 51, which also serves as a resin mold of the sensor, to re-image the emission pattern of the laser over the dividing line 53 perpendicular to the direction x"" parallel to the track. Wavefront-split beams 52a, 52b enter sensor segments 54a, 54b, respectively. The beams are of course diffracted by the wavefront splitting prism. For the separation at the re-imaging position, a light quantity of each beam is significant, but the diffraction pattern after separation is not specifically significant. Therefore, the sensor segment 54a, 54b may be sized large enough to cover each split beam 52a, 52b.

The spacing between the two beams 52a, 52b is widened by the prism herein, so that there occurs no problem concerning the gap between the sensor segments as described with the RF sectioned sensors 17, 18. Thus, signals sufficiently excluding the crosstalk can be detected at the imaging position. As shown in FIG. 3A, two outputs from the sensor segments 54a, 54b are supplied to a differential amplifier 55 to obtain a difference signal 57 therebetween and to a summing amplifier 56 to obtain a sum signal 58. The sum signal 58 is a monitor of front emission light quantity of laser 1, which is used for control to stabilize the output of laser 1 by the ordinary auto power control. The difference signal 57 represents disturbance of symmetry of an emission pattern in the direction perpendicular to the track, which is used for detecting jitters caused by fluctuation of a light spot in the edge direction or by fluctuation of an emission pattern of laser 1 in the sectional direction of the RF sectioned sensors 17, 18.

Figure 4:
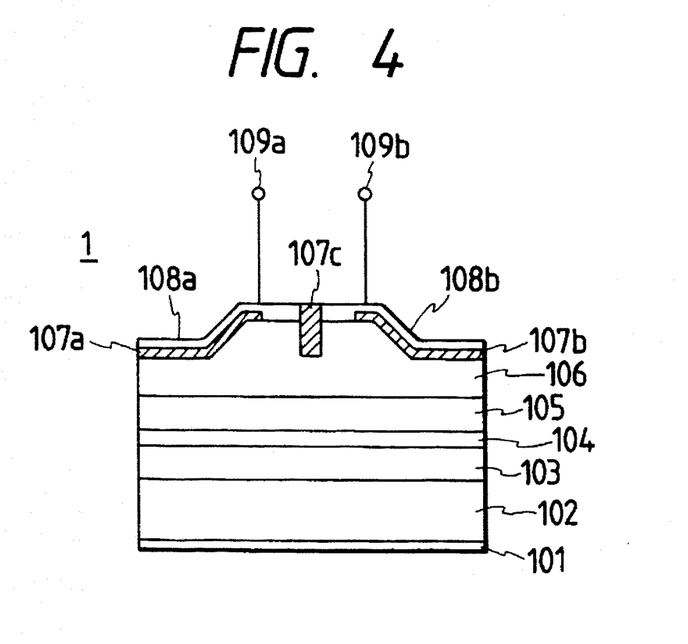
FIG. 4 is a schematic drawing to show a semiconductor laser with an emission pattern control function.

As described, better edge detection is made possible by detecting the emission fluctuation of laser 1 by means of the error detector 31 and feeding it back to the laser 1 through the laser drive controller 32. FIG. 4 is a schematic drawing to show the semiconductor laser 1 of AlGaAs/GaAs the emission pattern of which can be controlled. In FIG. 4, reference numeral 101 denotes AuGe/Au electrode, 102 n-GaAs substrate, 103 n-GaAlAs clad layer, 104 NQW-structured active layer, 105 p-GaAlAs clad layer, 106 $p^+$-GaAs cap layer, 107 SiN insulating layer, 108 Cr/Ar electrode, and 109 a current injection terminal. The laser 1 is produced by the MOCVD method, and etching is effected to form a groove to divide an injection current stripe into two.

The emission pattern can be controlled by controlling the current injected through the two electrodes 108a, 108b so as to make the carrier distribution uneven in the direction parallel to the active layer. Also, by detecting the emission distribution on the end plane of laser 1 (near field pattern) by the sectioned sensor 7 and controlling it, a light quantity distribution of a light spot can be controlled on the optical disk conjugate with the end plane. Further, since the far field pattern of emission of laser 1 is in relation of a substantial Fourier transform with the near field pattern, the far field pattern also can be controlled by controlling the near field pattern. Accordingly, the emission pattern can be stabilized as follows: the reference signal 57 obtained by detecting the near field pattern distribution of laser 1 is used as an error signal of symmetry of near field pattern of laser 1 in the direction perpendicular to the track; a control signal is superimposed on the error signal to obtain the injection current; and the injection current is injected through the terminals 109a, 109b into the split electrodes 108a, 108b. Also, an error signal of the sum signal 58 is evenly superimposed on the injection current flowing through the terminals 109a, 109b for negative feedback into the electrodes 108a, 108b, the overall output from the laser 1 can be controlled.

As described above, the present invention permits the control of the near field pattern or the far field pattern in recording or in reproduction, whereby edge recording or edge reproduction can be done at high quality.

The embodiment of the present invention as described above is an optical information recording/reproducing apparatus in which a beam from a laser is guided through a projection optical system to form an image of a micro light spot on an information track in an information record surface and in which reflected light from the information record surface or transmitted light therethrough is guided through a reception optical system to a first photodetector to record information on the information record surface and/or to reproduce information therefrom, wherein provided in an optical path of the projection optical system are a beam splitter for extracting a part of the beam and a second photodetector which is divided at least by a dividing line extending in the direction perpendicular to the information track in order to detect the extracted beam.

Also, the embodiment of the present invention is an optical information recording/reproducing apparatus in which a beam from a laser is guided through a projection optical system to form an image of a micro light spot on an information track in an information record surface and in which reflected light from the information record surface or transmitted light therethrough is guided through a reception optical system to a first photodetector to record information on the information record surface and/or to reproduce information therefrom, which comprises a second photodetector for detecting a spatial distribution of the laser beam and an electric circuit for electrically processing an output from the second photodetector to output an error to a reference value of the spatial distribution.

Figure 5:
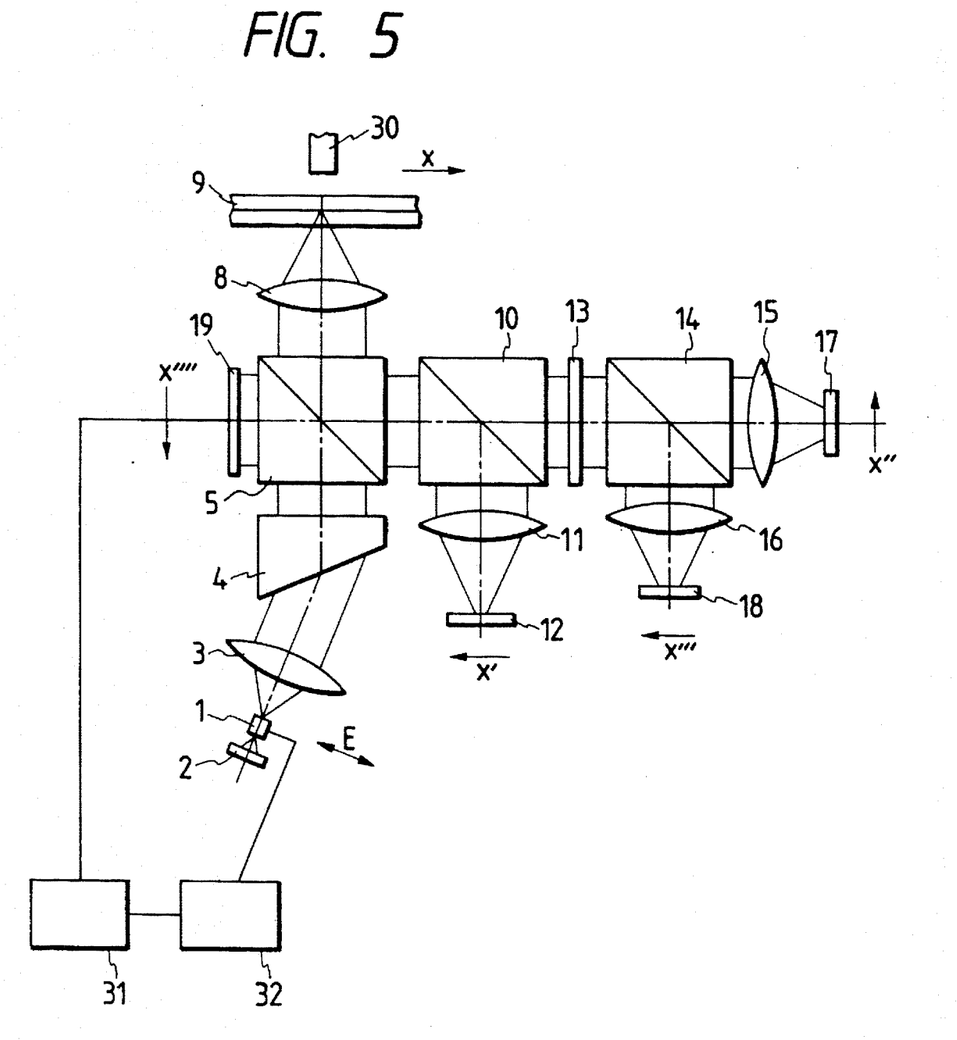
FIG. 5 is a schematic drawing of an optical system in an optical head to show the second embodiment.

FIG. 5 shows another embodiment according to the present invention. In FIG. 5, the same constituent members are denoted by the same reference numerals as those in FIG. 1, and are omitted in the explanation herein. In this embodiment, a half-sectioned sensor 19 is provided for detecting the front output of laser 1 in the far field range. In this arrangement, the edge detection is carried out in far field in reproduction, whereby the emission pattern can be controlled with less reproduction jitters. Since a diffraction pattern from the near field pattern of laser 1 is detected in far field in the present embodiment, a conceivable spectrum appearing in far field will include spatially decomposed orders of the transverse mode of the active layer (104) waveguide in near field. Thus, it is more effective to section the front monitor sectioned sensor 19 in the direction perpendicular to the x'''' direction into multiple segments, specifically as weighted at the position where the second order transverse mode spectrum appears, than to section it simply into two segments.

Figure 6:
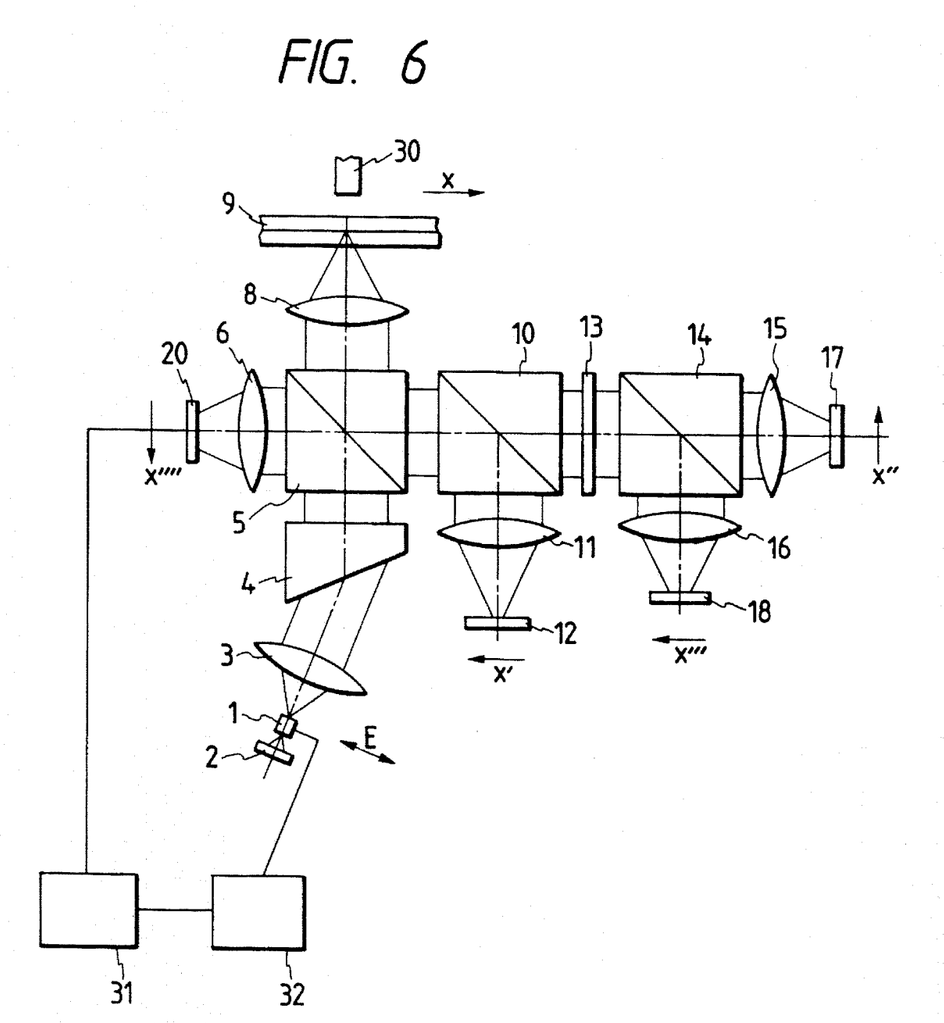
FIG. 6 is a schematic drawing of an optical system in an optical head to show the third embodiment.

FIG. 6 shows still another embodiment, which is effective further to decrease jitters in reproduction. In FIG. 6, the same constituent members are denoted by the same reference numerals as those in FIG. 1, and are omitted in the explanation herein. Specifically, the front monitor imaging lens 6 and the front monitor sectioned sensor 20 are substantially of the same types as the re-imaging lenses 15, 16 and as the RF sectioned sensors 17, 18 as structured in the same manner. This arrangement enables further removal of the influence of fluctuation of the laser emission pattern identical to the detection pattern in edge reproduction.

Figure 7:
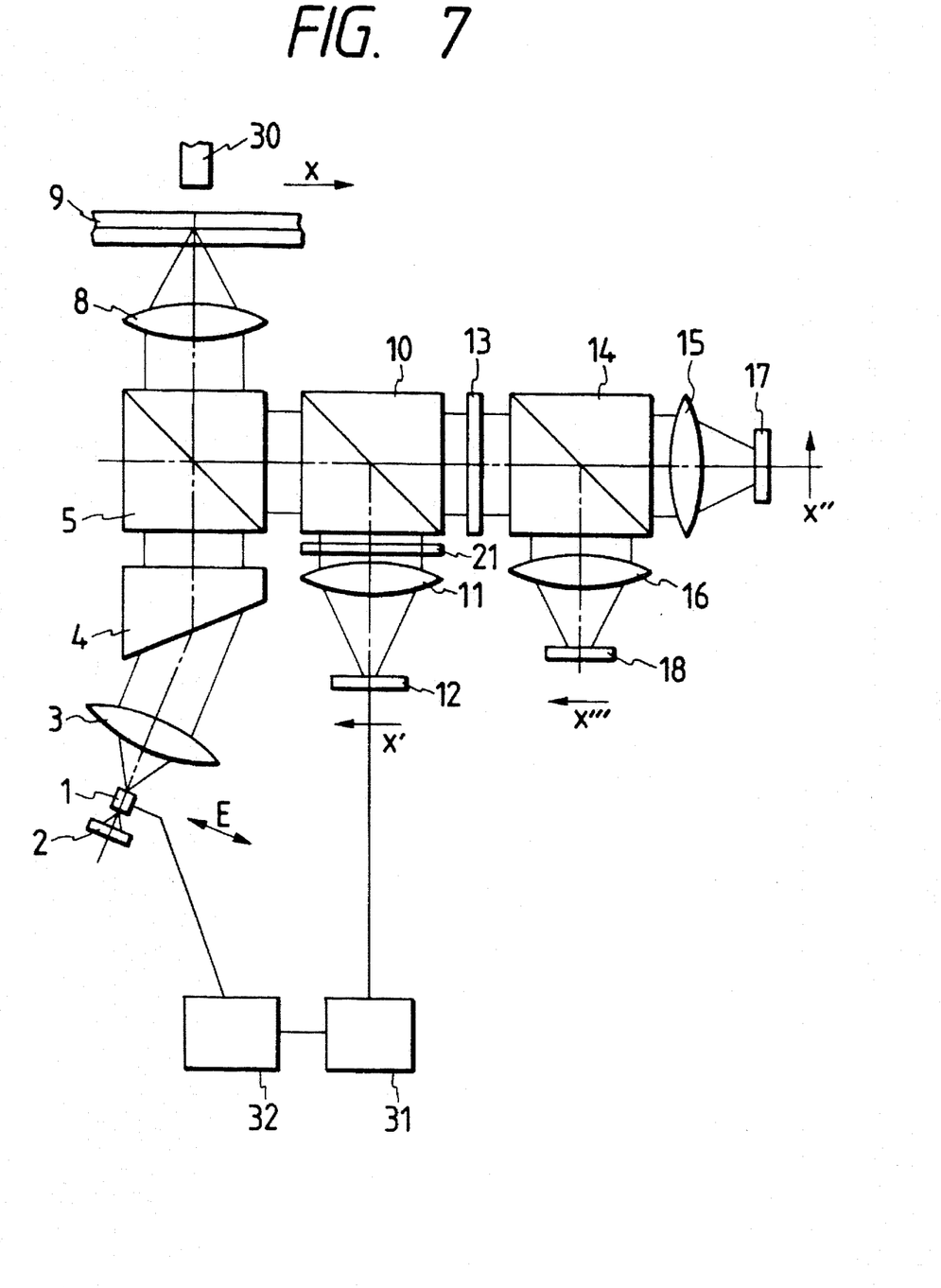
FIG. 7 is a schematic drawing of an optical system in an optical head to show the fourth embodiment.

FIG. 7 shows still another embodiment. In FIG. 7, the same constituent members are denoted by the same reference numerals as those in FIG. 1, and are omitted in the explanation herein. Specifically, an analyzer 21 is disposed in an optical path of a servo detection system in this embodiment. The analyzer 21 transmits only the E polarization (p-polarized light) but cuts off the s-polarized light. In the present embodiment, the servo sensor 12 detects the emission pattern of laser 1. For that, the s polarization component carrying domain edge signal is cut off by the analyzer 21. Since the autofocusing is carried out by the astigmatism method, the sensor 12 is located in the circle of least confusion, but it is not located at the imaging position. The sensor is in a far field where the autotracking can be effected by the push-pull method, so that the emission pattern of laser 1 may be detected in far field. As described, the fluctuation of emission of laser 1 is detected by the error detector 31 and is fed back to the laser 1 through the laser drive controller 32.

The sensor 12 is a quarter-sectioned sensor in the shape of a quartered square. An error signal for autofocusing is obtained by taking a difference between two diagonal sums. An error signal for autotracking is obtained by taking a difference between two parallel sums of two pairs of sensor segments on either side of the dividing line parallel to the direction x' parallel to the information track. Also, an error signal for emission pattern control is obtained by a calculation process in the direction perpendicular to the dividing direction for the autotracking error signal. In more detail, the emission pattern control error signal is obtained by taking a difference between two sums of two pairs of sensor segments on either side of a dividing line perpendicular to the direction x' parallel to the track. A little crosstalk occurs from the tracking diffraction pattern into the emission pattern detection, because the direction thereof is basically perpendicular to the diffraction pattern for tracking made by tracks. However, the crosstalk is more than those in the preceding embodiments. The present embodiment is effective to reduce the number of components, the production cost, and the size, because the sensor 12 can be used for the controls in common. The analyzer 21 can be omitted, if the s-polarization reflectivity of the beam splitter 10 is lowered.

The embodiment of the present invention as described above is an optical information recording/reproducing apparatus in which a beam from a laser is guided through a projection optical system to form an image of a micro light spot on an information track in an information record surface and in which reflected light from the information record surface or transmitted light therethrough is guided through a reception optical system to a first photodetector to record information on the information record surface and/or to reproduce information therefrom, wherein provided in an optical path of the reception optical system are a beam splitter for extracting a part of the beam and a second photodetector which is divided at least by a dividing line extending in a direction perpendicular to the information track in order to detect the extracted beam.

Figure 8:
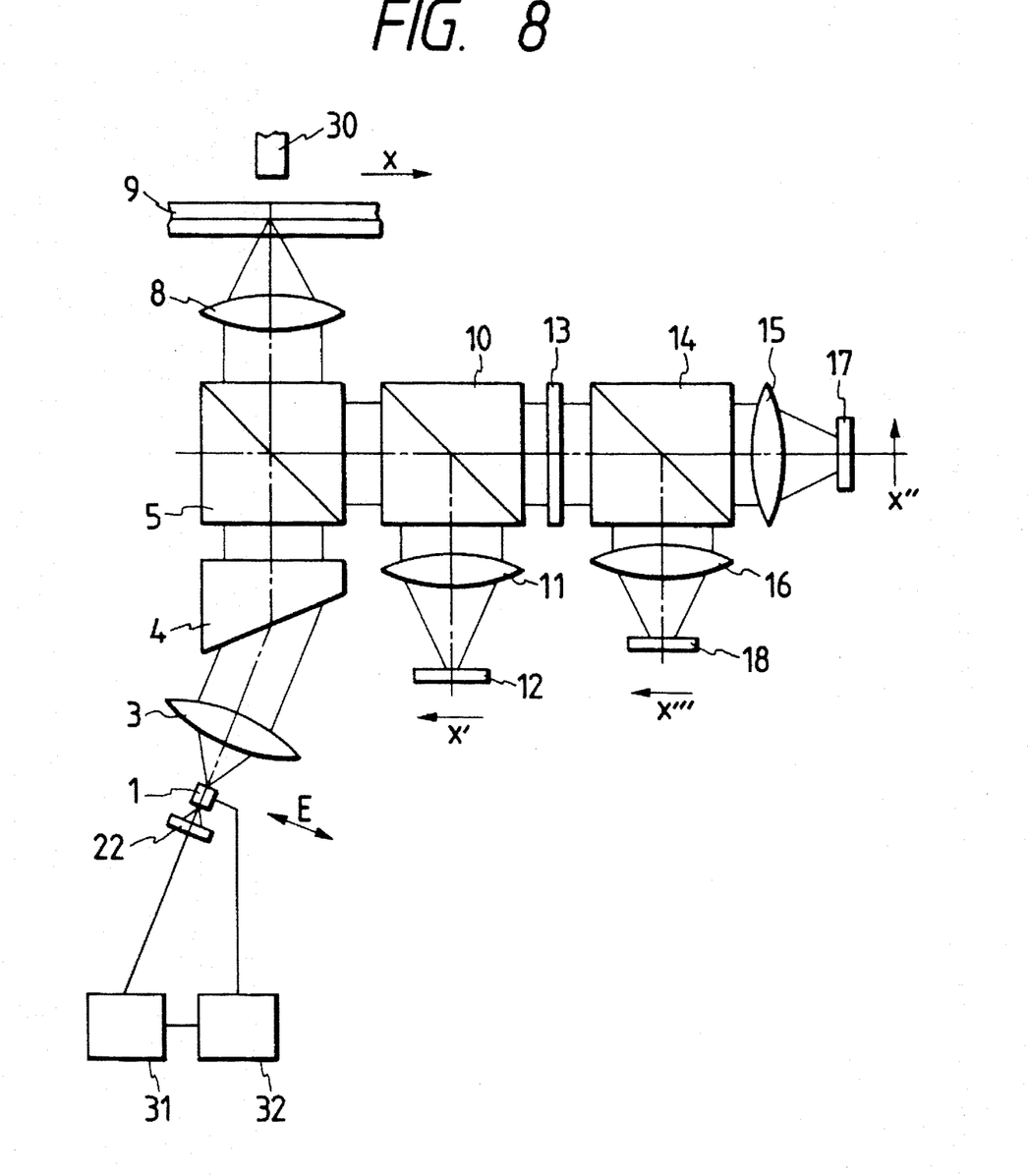
FIG. 8 is a schematic drawing of an optical system in an optical head to show the fifth embodiment.

FIG. 8 shows another embodiment. In FIG. 8, the same constituent members are denoted by the same reference numerals as those in FIG. 1, and are omitted in the explanation herein. Specifically, a monitor sectioned sensor 22 for monitoring the rear output of laser 1 is divided into two segments in the lamination direction by a dividing line perpendicular to the lamination direction of laser 1 corresponding to the direction parallel to the track. In the present embodiment, the error detector 31 detects fluctuation of an emission pattern of the rear output from laser 1 while the emission pattern of the front output from laser 1 is controlled thereby through the laser drive controller 32. This embodiment employs a monitor sensor 22 disposed within a container package of laser 1, which detects the far field pattern of rear output from the laser 1. As compared with the preceding embodiments, this arrangement further reduces the number of components, the production cost and the size. In addition, the arrangement of this embodiment can remove influence of a magneto-optical disk, e.g., influence of tracks, or influence of other optical systems in emission pattern detection, as compared with the embodiment of FIG. 7. The correlation is not always good between the front output irradiating the magneto-optical disk and the rear output of laser 1, especially if the laser has a reflectivity on the front end plane asymmetric to that on the rear end plane in order to increase the output. This point must be considered carefully. Although the sensor disposed in hybrid configuration in the same container with the laser is shown in this embodiment to detect the rear emission pattern of laser 1, the far field pattern may be also detected with a lens being inserted, the near field pattern may be used for the detection, or the sensor may be integrated in a monolithic manner, which can also realize the concept of the present invention.

The embodiment of the present invention as described above is an optical information recording/reproducing apparatus in which a projection optical system has at least a pair of light outputs and a first photodetector in the vicinity of at least one of said light outputs, in which a beam from a laser is guided through the projection optical system to irradiate an information record surface and to form an image of a micro light spot on an information track in the information record surface, and in which reflected light from the information record surface or transmitted light therethrough is guided through a reception optical system to a second photodetector to record information on the information record surface and/or to reproduce information therefrom, wherein said first photodetector comprises a divided photodetector which is divided at least by a dividing line extending in a direction perpendicular to the information track.

Figure 9:
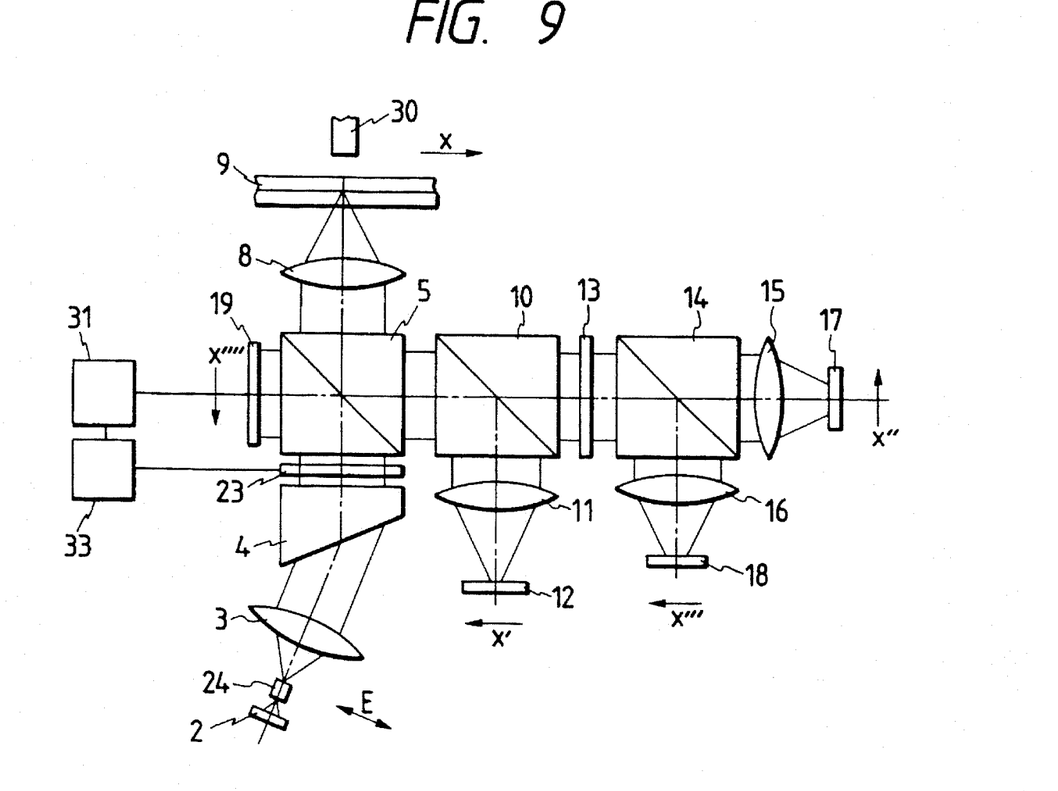
FIG. 9 is a schematic drawing of an optical system in an optical head to show the sixth embodiment.

FIG. 9 shows another embodiment. In FIG. 9, the same constituent members are denoted by the same reference numerals as those in FIG. 5. Specifically, a laser 24 is an ordinary semiconductor laser an emission pattern of which can be controlled, and a transmittance control filter 23 is disposed behind the beam shaping prism 4 to control a light quantity distribution of far field. In this embodiment, fluctuation of emission of laser 24, which is obtained by a half-sectioned sensor 19, is detected by an error detector 31, and is fed back to the transmittance control filter 23 through a filter drive controller 33.

Figure 10:
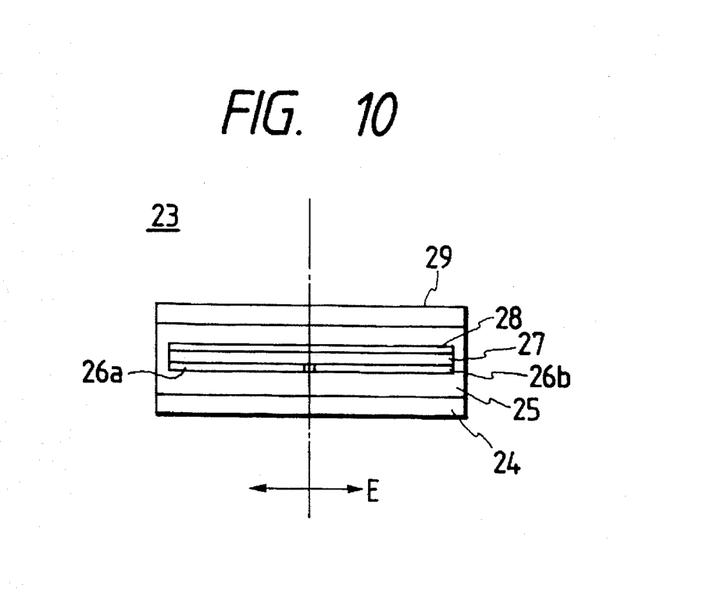
FIG. 10 is a schematic drawing of a liquid crystal filter.

FIG. 10 schematically shows the transmittance control filter 23. The linearly polarized light E (p-polarized light) from the laser 24 is rotated by 90° by a half-wave plate 24 to turn into s-polarized light. The s-polarized light passes through separate transparent electrodes 26a, 26b within glass 25, and is then rotated further by 90° by the optical rotary power of a TN liquid crystal 27 to turn into p-polarized light. The p-polarized light passes through a common transparent electrode 28 and glass 25 then to travel toward a polarizing plate 29. The polarizing plate 29 transmits the p-polarized light but cuts off the s-polarized light. The transparent electrodes 26a, 26b are separated from each other in the direction parallel to the track by a dividing line extending in the direction perpendicular to the direction parallel to the track. When a voltage is applied between the electrodes 26a, 26b and the common electrode 28, the orientation of the TN liquid crystal changes so that the optical rotary power thereof is lost. Then, the beam reaches the polarizing plate 29 in the polarization state including the s polarization component, and therefore the transmitted light therefrom is attenuated. With this function, the light quantity distribution of far field can be controlled by feeding the error signal of an emission pattern back to the two transparent portions.

Although the present embodiment employs the liquid crystal, the present invention is not limited to it. Devices enabling the spatial optical modulation can also be employed herein, and the polarization of transmitted light therethrough is preferably the p-polarization. If the transmittance control filter is of a type in which the polarization is not greatly manipulated, it can be disposed in the detection optical system after the polarizing beam splitter 5 instead of in the projection optical system. Such an arrangement, however, cannot correct the light quantity distribution of a light spot on an actual magneto-optical disk, but can correct only the pattern in the detection optical system. Therefore, it is effective only in reproduction.

The embodiment of the present invention as described above is an optical information recording/reproducing apparatus in which a beam from a laser is guided through a projection optical system to form an image of a micro light spot on an information track in an information record surface and in which reflected light from the information record surface or transmitted light therethrough is guided through a reception optical system to a first photodetector to record information on the information record surface and/or to reproduce information therefrom, wherein means is provided for changing a spatial distribution of the laser beam at least in correspondence with a direction parallel to the information track.

Also, the embodiment of the present invention is, as shown in FIG. 1 and FIG. 9, an optical information recording/reproducing apparatus in which a beam from a laser is guided through a projection optical system to form an image of a micro optical spot on an information track in an information record surface and in which reflected light from the information record surface or transmitted light therethrough is guided through a reception optical system to a photodetector to record information on the information record surface and/or to reproduce information therefrom, wherein laser beam distribution control means is provided in an optical path of the laser or the projection optical system, wherein the photodetector comprises a divided photodetector which is divided at least by a dividing line extending in a direction perpendicular to the information track, and wherein a beam distribution of the laser is controlled using an output obtained by electrically processing an output from the divided photodetector.

Figure 11:
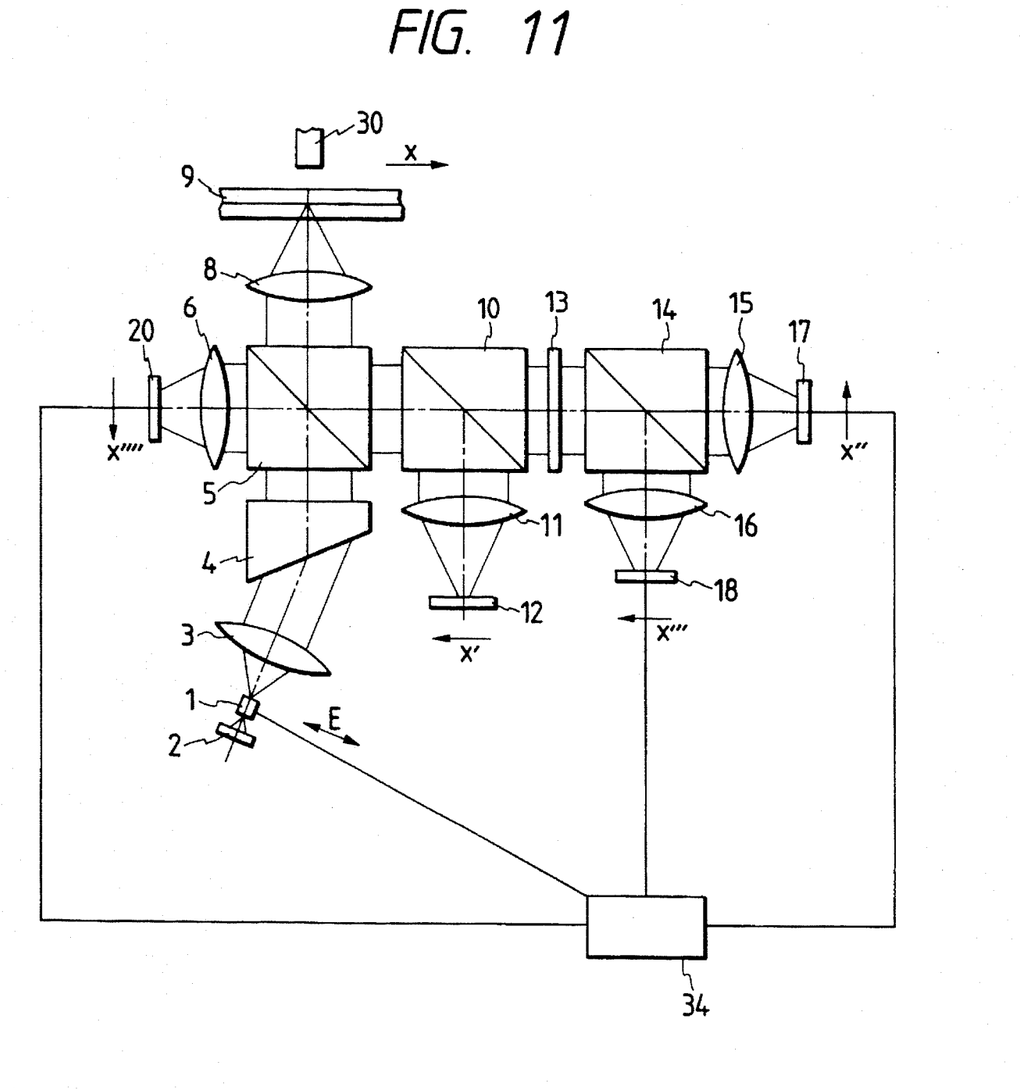
FIG. 11 is a schematic drawing of an optical system in an optical head to show the seventh embodiment.
Figure 12:
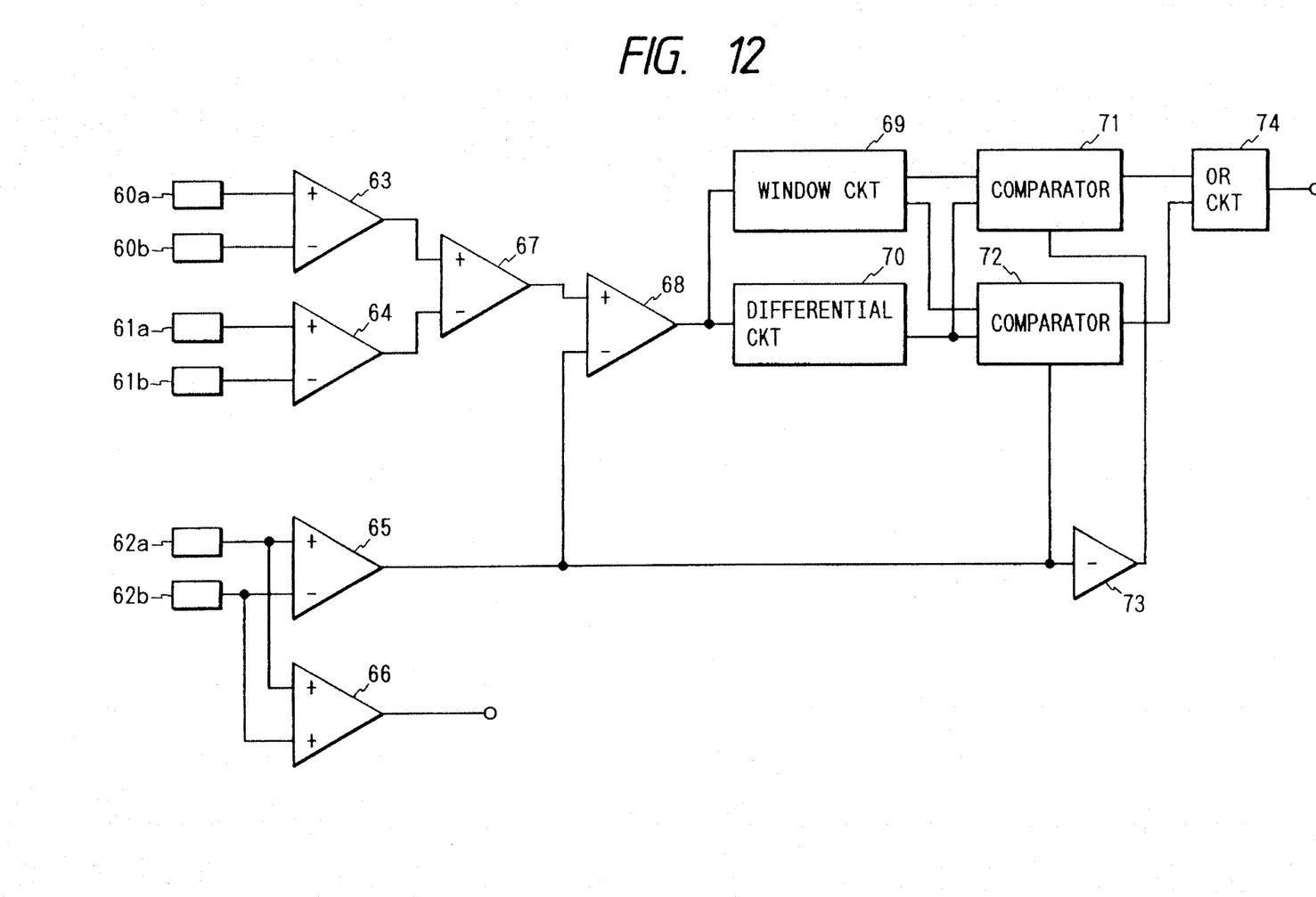
FIG. 12 is a block diagram of a processing circuit to show the seventh embodiment.

FIG. 11 shows another embodiment according to the present invention. In FIG. 11, the same constituent members are denoted by the same reference numerals as those in FIG. 6, and are omitted in the explanation herein. The present embodiment is so arranged that fluctuation of light quantity distribution of a light source or the like is detected by a sectioned sensor 20 and that an edge detection signal obtained by RF sectioned sensors 17, 18 is corrected using the signal of the sensor 20, whereby correct information reproduction may be carried out. FIG. 12 is a schematic block diagram to illustrate a signal processing portion 34 in this embodiment. In FIG. 12, reference numerals 60, 61 represent sensor segments for signal reproduction in the RF sectioned sensors 17, 18, respectively, which are constructed to carry out the differential detection for removing common-mode noises in the same manner as in the preceding embodiments. Numeral 62 stands for sensor segments for detecting a light quantity distribution in the sectioned sensor 20 similar to those in the preceding embodiments. The respective segments a, b in the sensors 60–62 are made spatially correspondent to each other. Outputs from the sensors 60–62 are transferred to differential amplifiers 63–65 for spatial differential detection. Further differential detection as described before is carried out for signal reproduction in a differential amplifier 67. Outputs from the light quantity detection sensor 62 are added to each other in a summing amplifier 66 to obtain a sum, which is used as an error signal for auto power control of a light source.

Figure 13A:
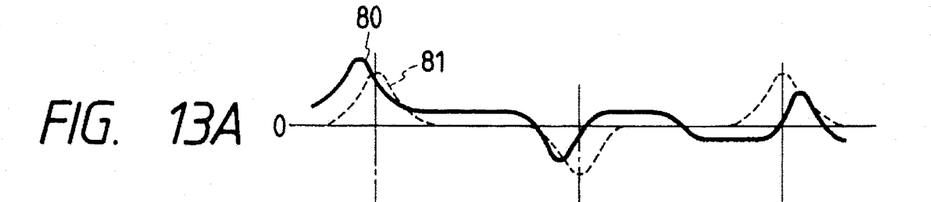
Figure 13B:
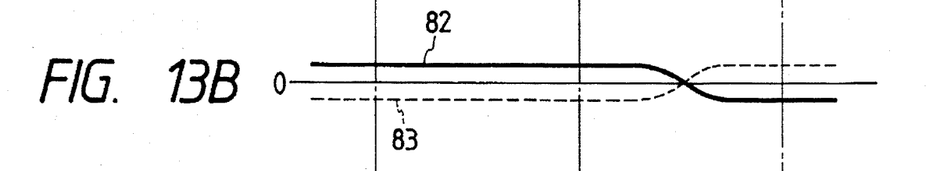
Figure 13C:
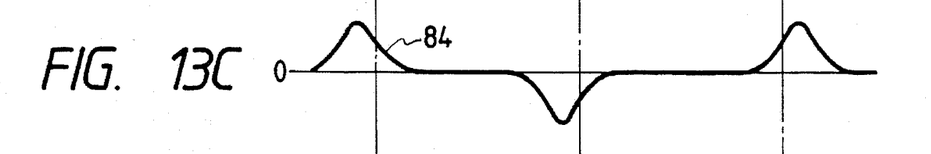
Figures 13D, 13E:
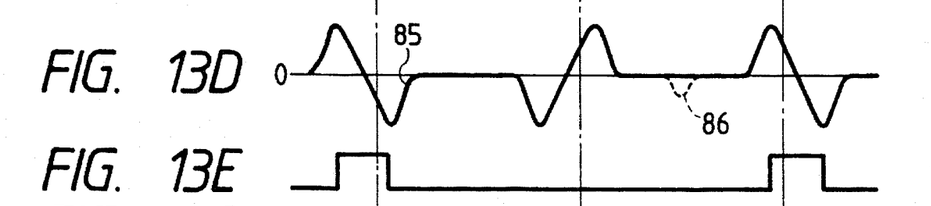

FIGS. 13A–13J are schematic drawings to show signal waveforms in the respective blocks. FIG. 13A shows an output waveform from the differential amplifier 67. With the fluctuation of light quantity distribution as shown, a differential signal waveform 80 includes DC component fluctuation and peak shift, which is deviated from an original signal waveform 81. An output waveform from the differential amplifier 65 is a light quantity distribution fluctuation waveform 82 as shown in FIG. 13B. A waveform 83 is obtained by inverting the waveform 82 in sign by an inverting amplifier 73. The light quantity change 82 is subtracted in the differential amplifier 68 from the DC component change of differential signal waveform 80, whereby the DC component is canceled. After canceling the DC component, a differential signal waveform 84 without DC component is obtained as shown in FIG. 13C. The peak shift still remains unremoved at this stage. Differentiating the waveform 84 by a differentiating circuit 70, a differentiation waveform 85 shown in FIG. 13D is obtained. The subtraction of light quantity fluctuation components in the differential amplifier 68 can remove noise waveforms, e.g., a waveform 86.

Figure 13F:
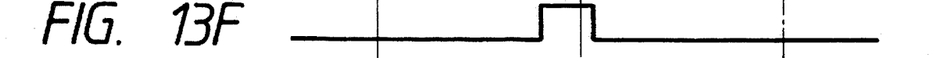
Figure 13G:
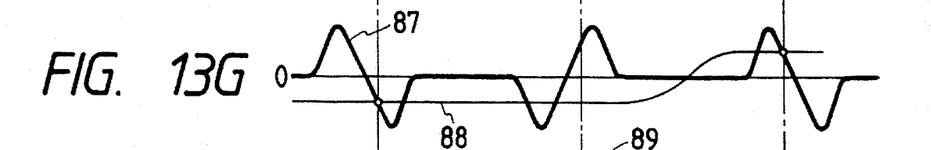
Figure 13H:
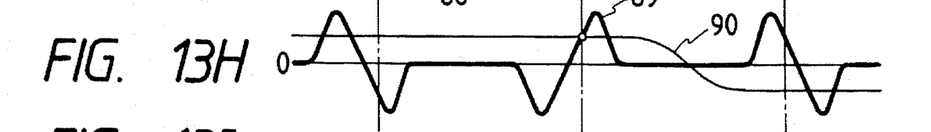
Figures 13I, 13J:
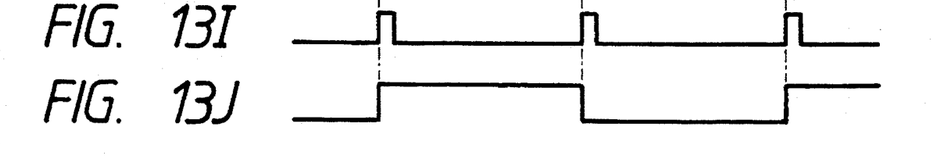

A window circuit 69 produces two window waveforms as shown in FIG. 13E and in 13F from the differential signal waveform 84. A zero cross point of the differentiation waveform 85 in the window represents an edge position. Edge positions are detected by comparators 71, 72 with respective window waveforms shown in FIG. 13E and FIG. 13F (for example corresponding to the front edge and the rear edge). The peak shift can be canceled by correcting a threshold value of each comparator by the light quantity fluctuation waveform 82, 83. In other words, as shown in FIG. 13G, a threshold waveform 88 is made from the inverted light quantity fluctuation waveform 83 for the differentiation waveform 87 input into the comparator 71, and an intersection is obtained therebetween within the window as shown in FIG. 13E, whereby the peak shift can be corrected. FIG. 13H shows the operation of the comparator 72 similar to the above. Thus correctly detected edge signals after peak shift correction are transferred to the OR circuit to obtain edge reproduction signals as shown in FIG. 13I or in FIG. 13J.

Figure 14:
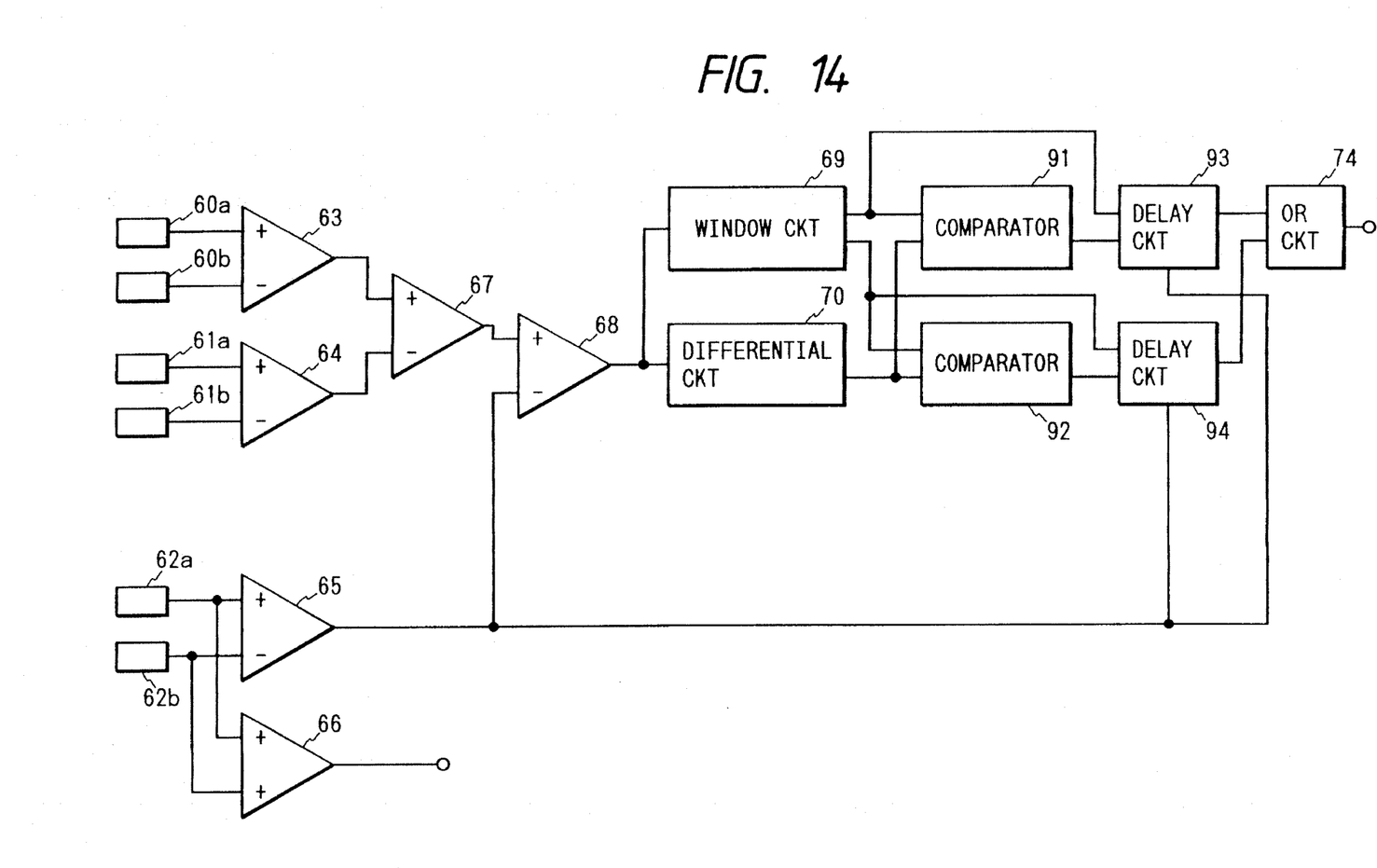
FIG. 14 is a block diagram of a processing circuit to show the eighth embodiment.

FIG. 14 shows another embodiment, in which the same constituent members are denoted by the same reference numerals as those shown in FIG. 12. In FIG. 14, a zero cross point of a differentiation waveform obtained in the differentiation circuit 70 is detected within a window obtained by the window circuit 69. Namely, the comparators 91, 92 corresponding to the two windows binarize each zero cross point as it is without executing the threshold correction, which is different from the embodiment of FIG. 12. Since the thus obtained signal is not corrected in peak shift, the signal is Given a proper delay according to the level of light quantity fluctuation waveform in delay circuit 93, 94. This arrangement can provide a binary data waveform from which the peak shift is relatively removed, and the OR circuit produces an edge reproduction signal therefrom.

In the present embodiment, the number of circuits increases and the edge reproduction signal is relatively delayed. In the preceding embodiments, jitters are produced unless the level change curve of the light quantity fluctuation waveform is matched with the nonlinearity of the waveform near zero cross of the differentiation signal waveform. Accordingly, the present embodiment is effective in a case of the nonlinearity being great.

The embodiment of the present invention as described above is an optical information recording and reproducing apparatus in which a beam from a laser is guided through a projection optical system to form an image of a micro optical spot on an information track in an information record surface and in which reflected light from the information record surface or transmitted light therethrough is guided through a reception optical system to a first photodetector to record information on the information record surface and/or to reproduce information therefrom, which comprises a second photodetector for detecting a spatial distribution of the laser beam and an electric processing circuit for correcting an output from the first photodetector with an output from the second photodetector.

Although the present invention was described with the embodiments of apparatus for reproducing information while receiving reflected light from an information record surface, the invention can also be applied with the same effect to apparatus for reproducing information while receiving transmitted light through the information record surface.

As described above, the present invention can provide an optical information recording/reproducing apparatus for edge recording and/or reproduction, in which an error caused by the light source in the edge arrangement direction is detected with respect to a regulated value of light quantity distribution and in which control means of light quantity distribution corrects the error or corrects a reproduction signal with the error, whereby realizing an excellent edge recording/reproducing apparatus with less jitters.

What is claimed is:

1. An optical head comprising:

irradiating means for irradiating a recording medium with a light beam;

separating means disposed in an optical path between the recording medium and said irradiating means, for separating a portion of the light beam traveling from said irradiating means to the recording medium; and detecting means having a plurality of sensor portions for detecting a light quantity distribution of the light beam separated by said separating means.

2. An optical head according to claim 1, wherein said detecting means is divided by a dividing line extending in a direction perpendicular to an information track of the recording medium.

3. An optical head according to claim 1, further comprising control means for controlling said irradiating means, based on an output from said detecting means.

4. An optical head comprising:

irradiating means for-irradiating a recording medium with a light beam;

light receiving means for receiving a reflected light beam or a transmitted light beam from the recording medium in order to reproduce information from the recording medium;

separating means disposed in an optical path between the recording medium and said light receiving means, for separating a portion of the light beam traveling from the recording medium to said light receiving means;

detecting means having a plurality of sensor portions for detecting a light quantity distribution of the light beam separated by said separating means; and control means for controlling said irradiating means on the basis of an output from said detecting means.

5. An optical head according to claim 4, wherein said detecting means is divided by a dividing line extending in a direction perpendicular to an information track of the recording medium.

6. An optical head comprising:

irradiating means for producing a front light beam for irradiating a recording medium and a rear light beam emitted in a direction opposite to an emission direction of the front light beam; and detecting means having a plurality of sensor portions for detecting a light quantity distribution of the rear light beam.

7. An optical head according to claim 6, further comprising control means for controlling said irradiating means, based on an output from said detecting means.

8. An optical head according to claim 6, wherein said detecting means is divided by a dividing line extending in a direction perpendicular to an information track of the recording medium.

9. An optical head comprising:

irradiating means for irradiating a recording medium with a light beam;

light receiving means for receiving a reflected light beam or a transmitted light beam from the recording medium in order to reproduce information from the recording medium;

separating means disposed in an optical path between the recording medium and said irradiating means, for separating a portion of the light beam traveling from said irradiating means to the recording medium;

detecting means for detecting a light quantity distribution of the light beam separated by said separating means; and signal processing means for processing a signal from said light receiving means and a signal from said detecting means.

10. An optical head according to claim 9, wherein said detecting means has a plurality of sensor portions.

11. An optical head according to claim 10, wherein said detecting means is divided by a dividing line extending in a direction perpendicular to an information track of the recording medium.

* * * * *